United States Patent [19]

Funderburk

[11] Patent Number: 4,909,849
[45] Date of Patent: Mar. 20, 1990

[54] METHOD AND MIXTURE FOR SOLIDIFYING AND IMMOBILIZING VARIOUS HAZARDOUS WASTE CONTAMINANTS IN AN ORGANIC MATRIX

[76] Inventor: Raymond E. Funderburk, P.O. Box 947, Katy, Tex. 77492

[21] Appl. No.: 202,932

[22] Filed: Jun. 6, 1988

Related U.S. Application Data

[63] Continuation-in-part of Ser. No. 42,470, Apr. 23, 1987, abandoned, Continuation-in-part of Ser. No. 42,471, Apr. 23, 1987, abandoned, Continuation-in-part of Ser. No. 42,472, Apr. 23, 1987, abandoned, Continuation-in-part of Ser. No. 42,473, Apr. 23, 1987, abandoned, Continuation-in-part of Ser. No. 798,831, Nov. 18, 1985, abandoned, Continuation-in-part of Ser. No. 798,832, Nov. 18, 1985, abandoned, Continuation-in-part of Ser. No. 798,833, Nov. 18, 1985, abandoned.

[51] Int. Cl.$^4$ .............................................. C04B 18/18
[52] U.S. Cl. ........................................ 106/90; 106/85; 106/315; 106/DIG. 1; 405/129; 210/751; 210/901
[58] Field of Search ...................... 106/DIG. 1, 85, 90, 106/92, 315; 405/129, 263, 264, 266; 210/751, 901

[56] References Cited

U.S. PATENT DOCUMENTS

| 4,089,696 | 5/1978 | Ray ................................. 106/97 X |
| 4,116,705 | 9/1978 | Chappell ............................. 106/90 |
| 4,210,457 | 7/1980 | Dodson et al. ..................... 106/97 |
| 4,230,568 | 10/1980 | Chappell ............................. 210/751 |
| 4,240,952 | 12/1980 | Hubert, Jr. et al. ..... 106/DIG. 1 X |
| 4,274,880 | 6/1981 | Chappell ............................. 106/90 |
| 4,354,876 | 10/1982 | Webster .......................... 106/105 X |
| 4,514,307 | 4/1985 | Chestnut et al. ................. 106/119 X |

OTHER PUBLICATIONS

Physico-Chemical Principles of the Action of Admixtures With Various Cements and Concretes, Topic II: "Effect of Admixtures on the Composition of the Liquid Phase and the Early Hydration Reactions in Portland Cement Pastes" by M. H. Roberts, International Symposium on Admixtures for Mortar and Concrete, Brussels, Aug. 30-Sep. 1, 1967.

Hawley, *The Condensed Chemical Dictionary*, 1971, p. 735.

"Paper VII-1. Some Chemical Additions and Admixtures in Cement Paste and Concrete", Session VII. Chemical Additions and Admixtures, Proceedings of the Fourth Int'l Symposium, Washington, 1960, Chemistry of Cement, Monograph 43, vol. II.

"A Review of the Mechanisms of Set-Retardation in Portland Cement Pastes Containing Organic Admixtures," J. F. Young, *Cement and Concrete Research*, vol. 2, 1972, pp. 415-433.

"Effect of Organic Compounds on the Interconversions of Calcium Aluminate Hydrates: Hydration of Tricalcium Aluminate," J. F. Young, *Journal of the American Ceramic Society*, vol. 53, 1970, pp. 65-69.

"Absorption of Admixtures on Portland Cement" by B. Blank et al., *Journal of the American Ceramic Society*, vol. 46, No. 8, pp. 395-399.

Primary Examiner—Mark L. Bell
Assistant Examiner—Karl Group
Attorney, Agent, or Firm—Browning, Bushman, Anderson & Brookhart

[57] ABSTRACT

A method of containing a liquid or semi-liquid hazardous waste found in an organic matrix, wherein the liquid or semi-liquid hazardous waste is mixed with combinations of calcium chloride, calcium formate, glycerine, pentaerythritol, 1,2-propanediol and pluraonic (Synperonic), water, and a cementitious material such as Portland cement, fly ash, or kiln dust. These various mixtures of chemicals, moisture levels and cementitious material solidify to immobilize the constituents in the hazardous waste to reduce the extractability of the constituents from the resulting mixture.

24 Claims, No Drawings

METHOD AND MIXTURE FOR SOLIDIFYING AND IMMOBILIZING VARIOUS HAZARDOUS WASTE CONTAMINANTS IN AN ORGANIC MATRIX

CROSS-REFERENCE TO RELATED APPLICATIONS

This application is a continuation-in-part of U.S. patent applications Ser. Nos. 42,470; 42,471; 42,472; and 42,473, all filed Apr. 23, 1987, and now abandoned, which in turn were continuations-in-part of U.S. patent applications Ser. Nos. 798,831; 798,832; 798,833; and 798,902, all filed Nov. 18, 1985, and now abandoned. The disclosures of the above applications are all incorporated herein by reference.

On Apr. 23, 1987, a continuation-in-part application entitled Method of Solidifying Liquid Organic Hazardous Waste to Create a Homogeneous Solid Utilizing Glycerin and a Polymer 1,2-Propanediol" was filed based on U.S. Ser. No. 798,831 and was assigned U.S. Ser. No. 042,470. Three related continuation-in-part applications entitled "Method of Solidifying Liquid Organic Hazardous Waste to Create a Homogeneous Solid Utilizing Tartaric Acid and a Polymer 1,2-Propanediol", "Method of Solidifying Liquid Organic Hazardous Waste to Create a Homogeneous Solid Utilizing Sucrose and a Polymer 1,2-Propanediol", and "Method of Solidifying Liquid Organic Hazardous Waste to Create a Homogeneous Solid Utilizing Succinic Acid and a Polymer 1,2-Propanediol were also filed April 23, 1987 and were accorded U.S. Ser. No.042,470, No.042,473, and No.043,471 respectively.

All previous applications were invented by and owned by the same inventor as the present application. The disclosure of the aforementioned applications are incorporated herein by reference. This application is a continuation-in-part of U.S. Ser. Nos. 042,470, 042,471, 042,472, and 042,473 filed April 23, 1987, which are continuations-in-part of U.S. Ser. Nos. 798,831, 798,832, 798,833, and 798,902, filed Nov. 18, 1985.

BACKGROUND OF THE INVENTION

1. Field of the Invention

The present invention relates to a method of chemically changing the physical state of hazardous waste contaminants found in an organic matrix. In particular, it relates to chemical bonding and microencapsulation of contaminants found in an organic matrix so that the contaminants are either immobilized or are partially immobilized in a homogeneous solid mass.

2. Background of the Prior Art

The disposal of hazardous wastes using a pozzolanic material has been attempted for many years. Solidification of inorganic hazardous waste found in the form of liquids, slurries, sludges and other forms of non-solids has been previously found to be possible by mixing the inorganic waste streams with a cementitious material such as Portland cement, fly ash, kiln dust, lime or a combination of these pozzolanic materials. A typical mixture could contain one part waste to two parts or more of cementitious material. The relative proportions of cementitious material added to the inorganic fluid is normally determined by the moisture content of the fluid as well as the percentage of suspended soils found in the fluid. If the inorganic hazardous waste is very aqueous, normally a great deal of cementitious material is required to eliminate the moisture. This usually results in a significant increase in volume of the waste after treatment.

It has also been known in the past that certain additives can be employed to accelerate the setting time and hardening of the inorganic fluid hazardous waste mixed with one or more combinations of the cementitious materials. Some of the more common accelerators used are calcium chloride, sodium carbonate, sodium silicate, sodium metasilicate, sodium hydroxide, and triethanolamine. It is also known that these accelerators are proportionately employed at levels from 5% to 10% based upon the dry weight of the cementitious material.

In the past, various attempts have been made to adapt the technology for solidification of inorganic hazardous waste to solidify hazardous waste contaminants in an organic waste matrix. An organic waste matrix is defined as a waste blend having carbon molecules present. Even when massive, proportionate amounts of pure Portland cement is mixed with organic-bearing waste to solidify the waste, batches of the organic waste remains in a plastic state and will not solidify.

Research in the past indicates that organic compounds act as an interference mechanism in the cementing process and inhibit the chemical reaction sufficiently to cause set retardation. There is little in the literature dealing with the set retardation phenomena of organics, and even less concerning the chemical or physical ability to overcome the retarding phenomena.

J.H. Taplin in 1962, Taplin, J.F., 1962, Discussion of paper by H.E. Vivian, Fourth Intern. Symp. Chemistry of Cements, Wash. D.C., U.S. National Bureau of Stds. Monogr. 43, Vol. II, p. 924, and later B. Blank, et. al., in 1963, Blank, B., D.R. Rossington, and L.A. Weinland, 1963, "Adsorption of Admixture on Portland Cement," American Ceramics Society, Vol. 46, p. 395., Brussels, Bldg. Res. Station (England), Paper 61, 68, introduced research findings that supported the retardation effects of organics with regard to a layering effect surrounding particles of cementitious material that blocked release of energies. They both postulated that the retarding organic effect is related to adsorption of organic molecules by crystalline particles. This strong adsorption and thick layering is generated by calcium sulfoaluminate hydrates resulting from the hydration of calcium hydroxide and calcium sulphate.

Calcium chloride has long been recognized within the cement industry as one of the most common accelerators used to speed up concrete setting times. Also, for example, U.S. Pat. No.4,240,952 issued to Hulbert et. al., stated that calcium chloride can be used to break the sulfo-aluminate layer encapsulating the cementitious particles. Hulbert stated that the addition of calcium chloride, to the extent of 3% by weight of the fly ash used, removes the sulfo-aluminate layer which inhibits hydration of the mixture.

When moisture is added to fly ash, chemical reactions proceed rapidly and are described by William C. Webster, in U.S. Pat. No. 4,354,876, as reactions"... resembling the flash set characteristics of improperly calcined or regulated Portland cement." As further stated by Webster, this flash set phenomena is prevalent in fly ash residue created by burning subbituminous and lignite coal. Because of the rapid flash set characteristic, much of the energy that could be released, if time permitted, is trapped. Additionally, as hydration occurs, the sulpho-aluminate layering effect occurs as well, which further adds to the encapsulating effect and blocks full release of the cementing energies. Bituminous fly ashes do not have the higher concentrations of calcium oxide and calcium sulfate, hence they will not harden rapidly when moisture is introduced.

In 1967, M.H. Roberts, M.H., 1967, "Effect of admixtures on the Composition of the Liquid Phase and the Early Hydration Reactions in Portland Cement Pastes, "Rilem Symposium on Admixtures for Mortar and Concrete, demonstrated that the addition of sucrose increases the concentration of calcium and alumina in solution to above normal levels. Further work by J.F. Young in 1972, Young, J.F., 1970, J. Amer. Ceram. Soc., V. 53, p. 65, Young, J.F., (1972), A Review of the Mechanisms of SetRetardation in Portland Cement Pastes Containing Organic Admixtures, Cement Concr. Res., Vol. 2, pp. 415–433, revealed that the formation of tricalcium aluminate, one of the key crystalline structures of fly ash cementing, is enhanced by additions of other sugar compounds such as succinic acid and tartaric acid in addition to sucrose. The work of both Roberts and Young demonstrate the ability to use sugar compounds to enhance crystalline development by keeping the key cementitious materials in suspension for greater periods of time.

The prior art does not teach an effective method of solidifying and immobilizing organic wastes in a homogeneous solid. It is the object of the present invention to teach a combination of components that, if used in the presence of Portland cement or fly ash, solidify and immobilize or partially immobilize various hazardous waste contaminants found in an organic matrix.

It is a further object of the present invention to teach a method for solidifying and completely or partially immobilizing various hazardous waste contaminants which are found in an organic matrix.

SUMMARY OF THE INVENTION

The invention discloses a method and mixture for containing a liquid or semi-liquid organic waste found in an organic matrix. The method is generally practiced by preparing a first mixture comprising water, a component for accelerating hydration of a cementitious material such as calcuim chloride or calcium formate, a compound for retarding flash set such as glycerine or pentaerychritol, and a component for reducing permeability such as 1,2-propanedial or pluronic (Synperonic). This first mixture is then mixed with the liquid or semi-liquid hazardous waste to form a homogeneous second mixture, and a cementitious material such as Portland cement, fly ash, or kiln dust is then mixed with the second mixture. The composite mixture formed by mixing the first mixture with the liquid or semi-liquid hazardous waste produces a product which immobilizes contaminants found in an organic matrix.

DETAILED DESCRIPTION OF THE PREFERRED EMBODIMENTS

The method of the preferred embodiment involves a series of chemical reactions generated by the introduction of a combination of chemical compounds and a cementitious material to an organic matrix containing various hazardous waste contaminants. The combination of chemical compounds, which may include calcium chloride, calcium formate, glycerin, pentaerythritol, 1,2-propanediol, and a polyoxyalkylene derivative of propylene glycol comprising difunctional block-polymers terminating in primary hydroxyl groups with molecular weights ranging from about 1,000 to greater than 15,000 and available under the trademarks PLURONIC ® and SYNPERONIC ®. is first added to the waste matrix and is blended thoroughly to ensure uniformity of consistency. As used herein, pluronic is better known by the trademark Synperonic. Preferably, if the moisture content of the organic matrix containing the contaminants is less than forty percent (40%), additional moisture is added to bring the level to forty percent (40%) during blending of the chemical compounds. However, it is believed that the moisture content can be as low as thirty percent (30%). Next, a cementitious material such as Portland cement, fly ash, or kiln dust is added. As the cementitious material reacts with the moisture present in the blend, calcium and alumina are released and maintained in suspension so that the maximum amount of energy present can contribute to an enhanced cementitious reaction.

The glycerine and pentaerythritol prevent early formation of tricalcium silicate and tricalcium aluminate but later contribute to development of these crystals. The addition of calcium chloride and calcium formate creates a chemical environment that accelerates hydration of tricalcium silicate. In addition, these compounds act to remove a calcium lignosulfate layer or thick film that is introduced onto the tricalcium silicate and tricalcium aluminate through adsorption. These compounds also generate a morphological change on the cementitious crystals formed which normally appear as cigar-shaped, hollow tubes. The crystals are altered and flattened with a thickened surface area five times greater than before. This enhanced surface area morphology creates significantly more bonding surface to support microencapsulation.

The addition of glycerine or pentaerythritol serve to increase the solubility of calcium and alumina in solution, thereby increasing the efficiency of crystalline development. Since these compounds maintain tricalcium aluminate and tricalcium silicate in suspension for a longer period of time, this generates a strong mass upon curing. The addition of 1,2-propanediol or PLURONIC ® (SYNERONIC ®) generates a dense mass with low permeability and porosity. Both substances also contribute to bonding.

Various combinations of calcium chloride, calcium formate, glycerine, pentaerythritol, 1,2-propanediol and PLURONIC (SYNPERONIC ®) are considered to be within the scope of the invention. For example, eighteen different combinations of these components are shown by the following chart:

| COMBINATIONS OF COMPOUNDS IN METHOD (expressed in grams) | | | | | | | | | |
|---|---|---|---|---|---|---|---|---|---|
| Combination Number: | 1 | 2 | 3 | 4 | 5 | 6 | 7 | 8 | 9 |
| CALCIUM CHLORIDE | 24 | 24 | 24 | 24 | 24 | 24 | 24 | 24 | 24 |
| CALCIUM FORMATE | | | | | | | | | |
| GLYCERINE | 12 | | 6 | 12 | | 6 | 12 | | 6 |
| PENTAERYTHRITOL | | 12 | 6 | | 12 | 6 | | 12 | 6 |
| 1,2-PROPANEDIOL | 6 | 6 | 6 | | | | 3 | 3 | 3 |
| PLURONIC ® (SYNPERONIC ®) | | | | 6 | 6 | 6 | 3 | 3 | 3 |
| Total grams each | 42 | 42 | 42 | 42 | 42 | 42 | 42 | 42 | 42 |
| Combination Number: | 10 | 11 | 12 | 13 | 14 | 15 | 16 | 17 | 18 |
| CALCIUM CHLORIDE | | | | | | | | | |
| CALCIUM FORMATE | 24 | 24 | 24 | 24 | 24 | 24 | 24 | 24 | 24 |
| GLYCERINE | 12 | | 6 | 12 | | 6 | 12 | | 6 |
| PENTAERYTHRITOL | | 12 | 6 | | 12 | 6 | | 12 | 6 |
| 1,2-PROPANEDIOL | 6 | 6 | 6 | | | | 3 | 3 | 3 |
| PLURONIC ® (SYNPERONIC ®) | | | | 6 | 6 | 6 | 3 | 3 | 3 |

-continued

| COMBINATIONS OF COMPOUNDS IN METHOD (expressed in grams) | | | | | | | | | |
|---|---|---|---|---|---|---|---|---|---|
| Combination Number: | 1 | 2 | 3 | 4 | 5 | 6 | 7 | 8 | 9 |
| Total grams each | 42 | 42 | 42 | 42 | 42 | 42 | 42 | 42 | 42 |

Compounds formed from these combinations are blended with a liquid or semi-liquid hazardous waste found in an organic matrix, and the resulting mixture is blended with water and a cementitious material such as Portland cement, fly ash, or kiln dust. In one embodiment of the invention, ten to twenty parts of cementitious material are added to one part of the combination compound. Moreover, it is contemplated that ratios of hazardous waste are added in one, two or three parts hazardous waste and water to one part cementitious material.

EXAMPLE

An organic matrix containing up to ten percent (10%) by weight of oils and greases, was found to contain up to 15,800 parts per million of barium. Using two of the method combinations, the following mixtures were completed:

MIXTURE #1
300 grams organic matrix with barium
150 grams Portland cement
20 grams of Combination compound No. 1
100 grams of $H_2O$ MIXTURE #2
300 grams organic matrix with barium
100 grams of fly ash
10 grams of Combination compound No. 10
100 grams of $H_2O$ MIXTURE #3
300 grams organic matrix with barium
150 grams of fly ash
20 grams of Combination compound No. 1
100 grams of $H_2O$ The samples were permitted to cure for a period of seven days to attain an unconfined compressive strength in excess of 500 psi. The samples were then subjected to the U.S. Environmental Protection Agency's Toxicity Characteristic Leaching Procedure ("TCLP") test. The TCLP laboratory test results for each of the three mixtures revealed that the barium found in the leachate (extracted) was significantly lower than the amount found before treatment. The results were as follows:

MIXTURE #1 12.441 parts per million barium
MIXTURE #2 2.600 parts per million barium
MIXTURE #3 3.519 parts per million barium As illustrated by this example, extraction of all three of the mixtures achieved toxicity levels of barium far below the Environmental Protection Agency standard toxic level for barium of 100 parts per million in extraction leachate.

To test for solidification strength of a compound or product formed by the processes disclosed herein, a control waste sample was developed that consisted of two hazardous waste heavy metals and an organic material. Identical samples were prepared in the following weights:

(A) 90 grams $ZnCl_2$ (zinc chloride)
(B) 0.98 grams $CdCl_2$ (cadmium chloride)
(C) 2.4 grams $C_6H_5ClO$ (parachlorophenol)
East waste sample was then dissolved in 22 grams of $H_2O$ with 0.75 grams of NaOH to render the $C_6H_5ClO$ soluble. Finally, sufficient $H_2O$ was added to bring each waste sample total weight to 1,200 grams.

Each waste sample was then blended with 120 grams of each combination of compounds taught by the method (42 grams of chemicals plus 78 grams of $H_2O$ for a total weight of 120 grams). This established a ratio of ten parts (1,200 g) of waste sample to one part (120 g) of combination compound. After thoroughly blending the waste and compound additive, 1,200 grams of Portland cement was added to each blend.

Thus, eighteen samples were prepared representing the eighteen combinations of compounds taught by the method. Each sample had a total weight of 2,520 grams (1,200 g waste/1,200 g cement/120 g combination compound). Each sample was allowed to cure for ten days. The samples were then subjected to the Unconfined Compressive Strength Test Method ASTM (D2166-85. The following chart reveals the strengths attained:

| COMBINATION COMPOUND NO. | PSI |
|---|---|
| 1 | 1000 |
| 2 | 740 |
| 3 | 827 |
| 4 | 696 |
| 5 | 638 |
| 6 | 696 |
| 7 | 755 |
| 8 | 696 |
| 9 | 900 |
| 10 | 1233 |
| 11 | 943 |
| 12 | 1161 |
| 13 | 1262 |
| 14 | 943 |
| 15 | 1030 |
| 16 | 1262 |
| 17 | 1045 |
| 18 | 1016 |

Similar strength and toxicity reduction tests were performed using a variety of combination compounds taught by the method in conjunction with various types of hazardous wastes blended in the same proportions. The following chart indicates toxicity reductions attained by TCLP extraction of leachate using eight different hazardous heavy metals:

| CONTAMINANT | BEFORE (ppm) | EPA TOXIC LEVEL (ppm) | AFTER COMBINATION BLENDING (extraction) (ppm) |
|---|---|---|---|
| Arsenic | 11.8 | 5.0 | 0.001 |
| Barium | 15,800.0 | 100.0 | 2.600 |
| Cadmium | 13.2 | 1.0 | 0.28 |
| Chromium | 68.0 | 5.0 | 0.132 |
| Lead | 265.0 | 5.0 | 0.503 |
| Mercury | 1.2 | 0.2 | 0.008 |
| Selenium | 2.0 | 1.0 | 0.005 |
| Silver | 7.5 | 5.0 | 0.038 |

These results demonstrate the effectiveness of the invention in containing a contaminant found in a liquid or semi-liquid hazardous waste in an organic matrix. Certain compounds may suitably replace the compounds disclosed without departing from the inventive concept herein taught. For example, compounds other than calcium chloride and calcium formate may accelerate the hydration of the tricalcium silicate in Portland cement without affecting the mechanism provided by the glycerine or pentaerychritol.

Because many varying and different embodiments may be made within the scope of the inventive concept herein taught, including equivalent combinations or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A method of containing a hazardous waste material comprising or contained in an organic matrix within a solidified material in which the hazardous waste is at least partially immobilized comprising the steps of:
preparing a first mixture comprising,
  a set accelerator for cementitious materials selected from the group consisting of calcium chloride and calcium formate;
  a set retarder for cementitious materials selected from the group consisting of glycerine, pentaerythritol and mixtures thereof;
  a permeability reducing agent selected from the group consisting of 1,2-propanediol, polyoxyalkylene derivatives of propylene glycol comprising difunctional block-polymers terminating in primary hydroxyl groups with molecular weights ranging from about 1,000 to greater than 15,000 and mixtures thereof; and
  water;
preparing a second mixture comprising a substantially homogeneous mixture of said first mixture with said hazardous waste material comprising or contained in an organic matrix;
preparing a slurry comprising said second mixture together with a cementitious material selected from the group consisting of Portland cement, fly ash and mixtures thereof; and
permitting said slurry to form a solid composition wherein said hazardous waste material is at least partially immobilized.

2. The method of claim 1, wherein the proportions of such first mixture are substantially:
water 65%
calcium chloride 20%
glycerine 10%
1,2-propanediol 5%
by weight.

3. The method of claim 2, wherein the proportions of such first mixture to the hazardous waste are between twenty and fifty volumes of the hazardous waste to one volume of said first mixture.

4. The method of claim 3, wherein the proportions of said second mixture to said cementitious material are one to four volumes of said cementitious material to one volume of said second mixture.

5. The method of claim 4, wherein the hazardous waste is parachlorophenol.

6. The method of claim 1, further comprising the step of mixing water with said second mixture and said cementitious material.

7. The method of claim 1, wherein the proportions of such first mixture are substantially:
water 65%
calcium chloride 20%
pentaerythritol 10%
1,2-propanediol 5%
by weight.

8. The method of claim 1, wherein the proportions of such first mixture are substantially:
water 65%
calcium chloride 20%
glycerine 5%
pentaerythritol 5%
1,2-propanediol 5%
by weight.

9. The method of claim 1, wherein the proportions of such first mixture are substantially:
water 65%
calcium chloride 20%
glycerine 10%
said difunctional block polymers 5%
by weight.

10. The method of claim 1, wherein the proportions of such first mixture are substantially:
water 65%
calcium chloride 20%
pentaerythritol 10%
said difunctional block polymers 5%
by weight.

11. The method of claim 1 wherein the proportions of such first mixture are substantially:
water 65%
calcium chloride 20%
glycerin 5%
pentaerythritol 5%
said difunctional block polymers 5%
by weight.

12. The method of claim 1, wherein the proportions of such first mixture are substantially:
water 65%
calcium chloride 20%
glycerine 10%
1,2-propanediol 2.5%
said difunctional block polymers 2.5%
by weight.

13. The method of claim 1, wherein the proportions of such first mixture are substantially:
water 65%
calcium chloride 20%
pentaerythritol 10%
1,2-propanediol 2.5%
said difunctional block polymers 2.5%
by weight.

14. The method of claim 1, wherein the proportions of such first mixture are substantially:
water 65%
calcium chloride 20%
glycerine 5%
pentaerythritol 5%
1,2-propanediol 2.5%
said difunctional block polymers 2.5%
by weight.

15. The method of claim 1, wherein the proportions of such first mixture are substantially:
water 65%
calcium formate 20%
glycerine 10%
1,2- propanediol 5%
by weight.

16. The method of claim 1, wherein the proportions of such first mixture are substantially:
water 65%
calcium formate 20%
pentaerythritol 10%

1,2-propanediol 5%
by weight.

17. The method of claim 1, wherein the proportions of such first mixture are substantially:
water 65%
calcium formate 20%
glycerine 5%
pentaerythritol 5%
1,2-propanediol 5%
by weight.

18. The method of claim 1, wherein the proportions of such first mixture are substantially:
water 65%
calcium formate 20%
glycerine 10%
said difunctional block polymers 5%
by weight.

19. The method of claim 1, wherein the proportions of such first mixture are substantially:
water 65%
calcium formate 20%
pentaerythritol 10%
said difunctional block polymers 5%
by weight.

20. The method of claim 1, wherein the proportions of such first mixture are substantially:
water 65%
calcium formate 20%
glycerine 5%
pentaerythritol 5%
said disfunctional block polymers 5%
by weight.

21. The method of claim 1, wherein the proportions of such first mixture are substantially:
water 65%
calcium formate 20%
glycerine 10%
1,2-propanediol 2.5%
said disfunctional block polymers 2.5%
by weight.

22. The method of claim 1, wherein the proportions of such first mixture are substantially:
water 65%
calcium formate 20%
pentaerythritol 10%
1,2-propanediol 2.5%
said disfunctional block polymers 2.5%
by weight.

23. The method of claim 1, wherein the proportions of such first mixture are substantially:
water 65%
calcium formate 20%
glycerine 5%
pentaerythritol 5%
1,2-propanediol 2.5%
said disfunctional block polymers 2.5%
by weight.

24. A composition comprising a solid, substantially homogenous cement-like mass within which a hazardous waste material comprising or contained in an organic matrix has been at least partially immobilized, said composition having been formed by the method of claim 1.

* * * * *

UNITED STATES PATENT AND TRADEMARK OFFICE
CERTIFICATE OF CORRECTION

PATENT NO. : 4,909,849

DATED : March 20, 1990

INVENTOR(S) : Raymond E. Funderburk

It is certified that error appears in the above-identified patent and that said Letters Patent is hereby corrected as shown below:

In Claim 11, at col. 8, line 30, change "disfunctional" to "difunctional".

In Claim 12, at col. 8, line 38, change "disfunctional" to "difunctional".

In Claim 13, at col. 8, line 46, change "disfunctional" to "difunctional".

In Claim 14, at col. 8, line 55, change "disfunctional" to "difunctional".

In Claim 20, at col. 9, line 31, change "disfunctional" to "difunctional".

In Claim 21, at col. 10, line 7, change "disfunctional" to "difunctional".

In Claim 22, at col. 10, line 15, change "disfunctional" to "difunctional".

UNITED STATES PATENT AND TRADEMARK OFFICE
CERTIFICATE OF CORRECTION

PATENT NO. : 4,909,849

DATED : March 20, 1990

INVENTOR(S) : Raymond E. Funderburk

It is certified that error appears in the above-identified patent and that said Letters Patent is hereby corrected as shown below:

In claim 23, at col. 10, line 24, change "disfunctional" to "difunctional".

Signed and Sealed this

Ninth Day of April, 1991

*Attest:*

HARRY F. MANBECK, JR.

*Attesting Officer*      *Commissioner of Patents and Trademarks*